US011888251B2

(12) United States Patent
Oettle et al.

(10) Patent No.: US 11,888,251 B2
(45) Date of Patent: Jan. 30, 2024

(54) CONTACT ELEMENT FOR AN ELECTRICAL PLUG

(71) Applicant: TE Connectivity Germany GmbH, Bensheim (DE)

(72) Inventors: Andreas Oettle, Woert (DE); Stefan Raab, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 7 days.

(21) Appl. No.: 17/710,506

(22) Filed: Mar. 31, 2022

(65) Prior Publication Data

US 2022/0320777 A1 Oct. 6, 2022

(30) Foreign Application Priority Data

Mar. 31, 2021 (DE) ......................... 102021108272.2

(51) Int. Cl.
*H01R 13/11* (2006.01)

(52) U.S. Cl.
CPC .................................... *H01R 13/11* (2013.01)

(58) Field of Classification Search
CPC ........ H01R 13/11; H01R 13/10; H01R 13/08; H01R 13/02
USPC .......................................................... 439/816
See application file for complete search history.

(56) References Cited

U.S. PATENT DOCUMENTS 4,968,270 A 11/1990 Colleran et al.
5,049,095 A 9/1991 Gugelmeyer
5,151,056 A 9/1992 McClune
5,645,458 A 7/1997 Hotea
5,951,336 A * 9/1999 Seko .................... H01R 13/432 439/748
7,192,318 B2 * 3/2007 Hotea .................. H01R 13/113 439/745
7,976,351 B2 * 7/2011 Boemmel ............ H01R 13/432 439/748
(Continued)

FOREIGN PATENT DOCUMENTS

DE 102007040937 B3 1/2009
DE 102015201635 A1 8/2016
(Continued)

OTHER PUBLICATIONS

Germany's Office Action, Application No. 102021108272.2, dated Jan. 1, 2022, 4 pages.
(Continued)

*Primary Examiner* — Harshad C Patel
(74) *Attorney, Agent, or Firm* — Barley Snyder

(57) ABSTRACT

A contact element for an electrical plug includes a base and a spring element deflectable towards and/or away from the base. The spring element is laterally limited by a first side flank and a second side flank. The spring element has a spring base at an end of the spring element connected to the base. The spring element extends away from the spring base in a longitudinal direction. The first side flank is closer to the base than the second side flank and the second side flank faces away from the first side flank. The first side flank has a first length and the second side flank has a second length. A ratio of the second length to the first length is greater than or equal to 0.5.

19 Claims, 3 Drawing Sheets

(56) References Cited

U.S. PATENT DOCUMENTS

| | | | | |
|---|---|---|---|---|
| 8,251,759 | B2 * | 8/2012 | Matsunaga | H01R 4/185 439/877 |
| 9,799,976 | B2 * | 10/2017 | Lehner | H01R 13/04 |
| 10,276,959 | B2 * | 4/2019 | Lehner | H01R 13/187 |
| 10,439,316 | B2 * | 10/2019 | Leonhardt | H01R 13/432 |
| 2001/0019925 | A1 * | 9/2001 | Heimueller | H01R 13/114 439/851 |
| 2006/0035538 | A1 | 2/2006 | Suemitsu et al. | |
| 2007/0123093 | A1 * | 5/2007 | Lutsch | H01R 13/432 439/445 |
| 2010/0029146 | A1 * | 2/2010 | Myer | H01R 13/15 439/852 |
| 2013/0273790 | A1 | 10/2013 | Jakoplic et al. | |
| 2017/0294731 | A1 | 10/2017 | Leonhardt | |
| 2017/0324184 | A1 | 11/2017 | Lehner et al. | |
| 2022/0181812 | A1 | 6/2022 | Hibino et al. | |

FOREIGN PATENT DOCUMENTS

| | | | |
|---|---|---|---|
| FR | 3048133 | B1 | 8/2017 |
| JP | 2014222650 | A1 | 11/2014 |
| JP | 2018504754 | A | 2/2018 |
| JP | 2020177793 | A | 10/2020 |
| WO | 2016120481 | A1 | 8/2016 |
| WO | 2017139249 | A1 | 8/2017 |
| WO | 2017140858 | A1 | 8/2017 |

OTHER PUBLICATIONS

Extended European Search Report dated Aug. 24, 2022 corresponding to Application No. 22164897.5-1201 and Client Reference EP133448-PE302TRbha, 10 pages.

Office Action from the Japanese Patent Office dated Feb. 21, 2023, corresponding to Application No. 2022-051086 with English translation, 7 pages.

* cited by examiner

CONTACT ELEMENT FOR AN ELECTRICAL PLUG

CROSS-REFERENCE TO RELATED APPLICATIONS

This application claims the benefit of the filing date under 35 U.S.C. § 119(a)-(d) of German Patent Application No. 102021108272.2, filed on Mar. 31, 2021.

FIELD OF THE INVENTION

The present invention relates to a contact element for an electrical plug.

BACKGROUND

Contact elements for electrical plugs are known from the prior art. Often, such contact elements have contact springs which establish a mechanical and electrical connection between the contact element and a mating contact element of a complementary plug due to their spring force. To ensure that this electrical contacting can be reliably established, different requirements are made on the contact spring depending on the plug geometry, in particular on the contact force or normal force that can be achieved by the contact spring. Furthermore, it is desirable to miniaturize such contact elements without reducing the quality of the electrical connection. However, the smaller size and, in particular smaller wall thicknesses, of miniaturized contact elements reduce the spring force of the contact spring, which impairs the reliability of the electrical and mechanical contacting.

SUMMARY

A contact element for an electrical plug includes a base and a spring element deflectable towards and/or away from the base. The spring element is laterally limited by a first side flank and a second side flank. The spring element has a spring base at an end of the spring element connected to the base. The spring element extends away from the spring base in a longitudinal direction. The first side flank is closer to the base than the second side flank and the second side flank faces away from the first side flank. The first side flank has a first length and the second side flank has a second length. A ratio of the second length to the first length is greater than or equal to 0.5.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
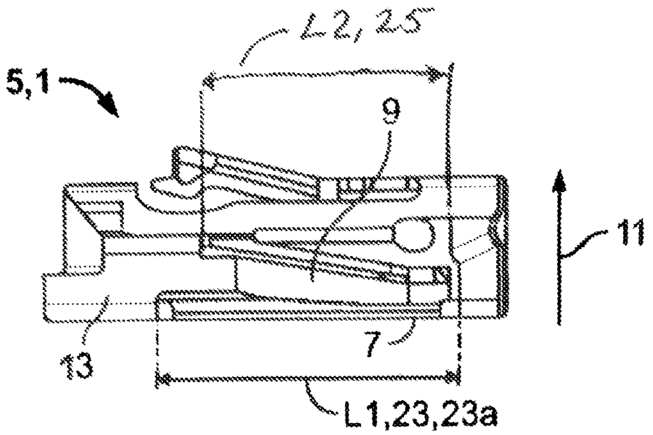
FIG. 1 is a side view of a contact element according to an embodiment.

In the following, the invention is exemplarily described in more detail by embodiments with reference to the accompanying figures. In the figures, elements which correspond to one another in terms of structure and/or function are provided with the same reference signs.

The combinations of features shown and described in the individual embodiments are for explanatory purposes only. A feature of an embodiment may be omitted if its technical effect is not important for a particular application. Conversely, another feature may be added to an embodiment if its technical effect is advantageous for a particular application.

FIGS. 1 to 5 each show a side view of a contact element 1 according to the invention. In an embodiment, the contact elements 1 are made from a sheet metal 3; they may be stamped bent parts 5. Each of the contact elements 1 has a base 7 and a spring element 9. The spring element 9 can be deflected towards and/or away from the base 7 along or opposite to a deflection direction 11. The deflection direction 11 is only shown in FIG. 1.

The deflection of the spring element 9 may allow effective deflection of the base 7 at a spring base 15 when the spring element 9 is deflected, since deflection of the spring element 9 perpendicularly towards and/or away from the base 7 results in bulging of the base 7. If the deflection of the spring element 9 occurs at an angle not equal to 90° to the base 7, a fraction of the force acting on the base 7 can act on the base 7 within the plane of the base 7. Within the plane of the base 7, the latter is torsionally stiff (compared to bending perpendicular to the base 7), so that an application of a force within the plane of the base 7 does not support the resetting of the spring element 9.

Figure 8:
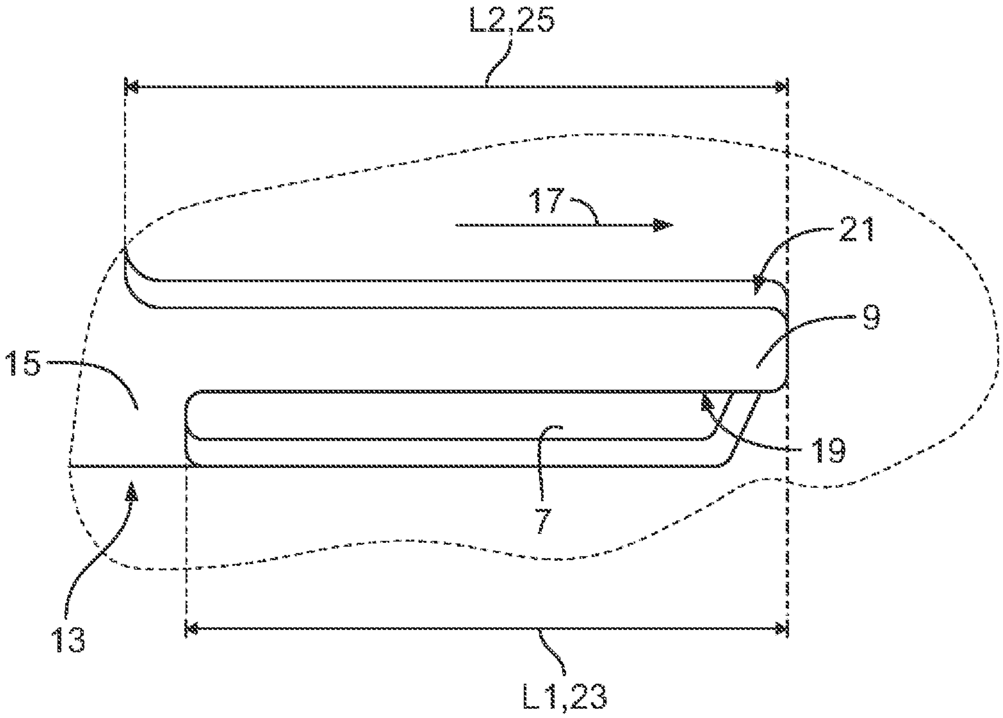
FIG. 8 is a schematic detailed view of a spring element according to an embodiment.

The spring element 9 is shown in simplified form in FIG. 8. The spring element 9 is, in an embodiment, connected to the base 7 at one end 13 of the spring element 9 by a spring base 15. The spring element 9 extends away from this spring base 15 in a longitudinal direction 17 and is deflectable at an end opposite the end 13 in the longitudinal direction 17. In the shown embodiment, the spring element 9 has a first side flank 19 and a second side flank 21 opposite to the first side flank 19 and facing away from the first side flank 19. The first side flank 19 is arranged closer to the base 7 than the second side flank 21. The spring element 9 is limited laterally by the first side flank 19 and the second side flank 21. The spring element 9 may have a flat side limited by the two side flanks 19, 21, which lie in a plane and point in opposite directions. The spring element 9 may lie substantially in a plane oriented substantially perpendicular to the base 7.

The first side flank 19 has a length L1, which can also be referred to as a cut length 23 and/or a first length, indicating the length over which the spring element 9 is mechanically separated from the base 7. The distance between the deflectable end and the spring base 15 corresponds to the cutting length or L1. In particular, if there are several side flanks, L1 can be the length of that side flank which is closest to the base 7, i.e. has the smallest distance to the base 7.

The second side flank 21 has a length L2, which can be referred to as a bending length 25 and/or a second length, and indicates over which length the spring element 9 can be deflected towards and/or away from the base 7; L2 can be considered the length of a spring arm. For the sake of clarity, the bending length 25 is shown only in FIGS. 3 and 8.

The side flanks 19, 21 may extend linearly away from the spring base 15 in the longitudinal direction 17, but may also extend only approximately in the longitudinal direction 17. In this case, the side flanks 19, 21 may extend in sections proportionally perpendicular to the longitudinal direction 17, i.e. extend inclined to the longitudinal direction 17. The side flanks 19, 21 can run towards each other in the longitudinal direction 17 so that the spring element 9 tapers towards the end opposite the spring base 15. The end opposite the spring base 15 can also be referred to as a free end.

The contact element 1 can have a sheet thickness of less than 0.2 mm. The sheet thickness may be between 0.1 mm and 0.2 mm, and may be 0.12 mm, for example. With such a sheet thickness, it may be possible that the normal force applied by the spring element 9, for example for contacting, is too low to establish a reliable electrical contact. However, this spring force can be varied by varying the cut length 23, as described below.

The bending length 25 is identical for the embodiments of FIGS. 1-5. The cut length 23, however, differs in the embodiments shown in FIGS. 1-5. These will be referred to below as 23*a* to 23*e*. In the given example, the bending length 25 is 2.8 mm and the cut lengths 23 are respectively:

23*a:* 3.30 mm
23*b:* 2.80 mm
23*c:* 2.25 mm
23*c:* 2.00 mm
23*d:* 1.525 mm.

These sizes are purely exemplary and may deviate in other embodiments, for example by ±200%. The difference between the bending length 25 and the cut length 23 can be referred to as the length L3 of the spring base 15. It has been found that the choice of the length of the spring base 15, i.e. the choice of the ratio between the bending length 25 and the cut length 23, can be largely decisive for determining the restoring force exerted by the spring element 9, as well as for irreversible permanent strain or deformation of the spring element 9.

Figure 5:
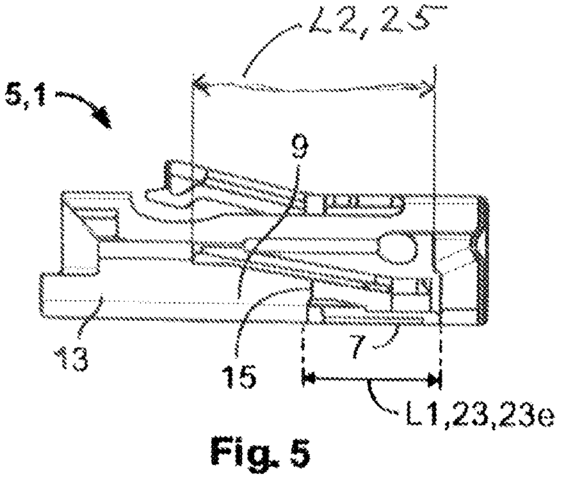
FIG. 5 is a side view of a contact element according to another embodiment.
Figure 6:
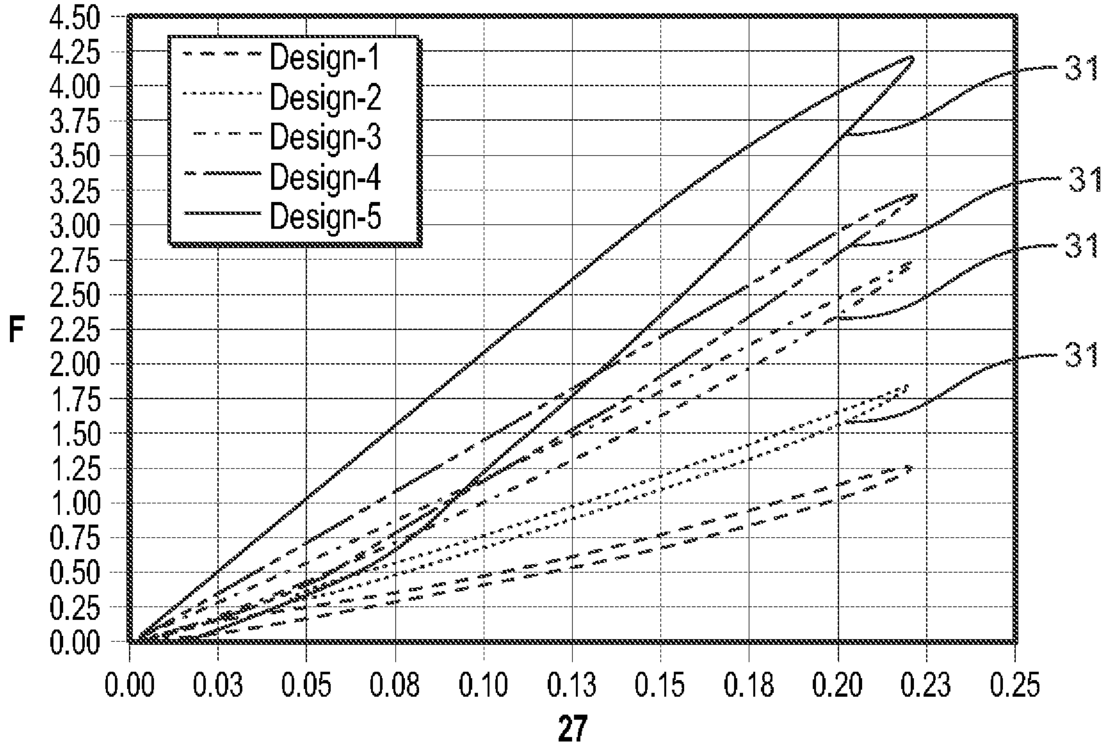
FIG. 6 is a graph of a restoring force of the contact elements according to the embodiments of FIGS. 1-5.
Figure 7:
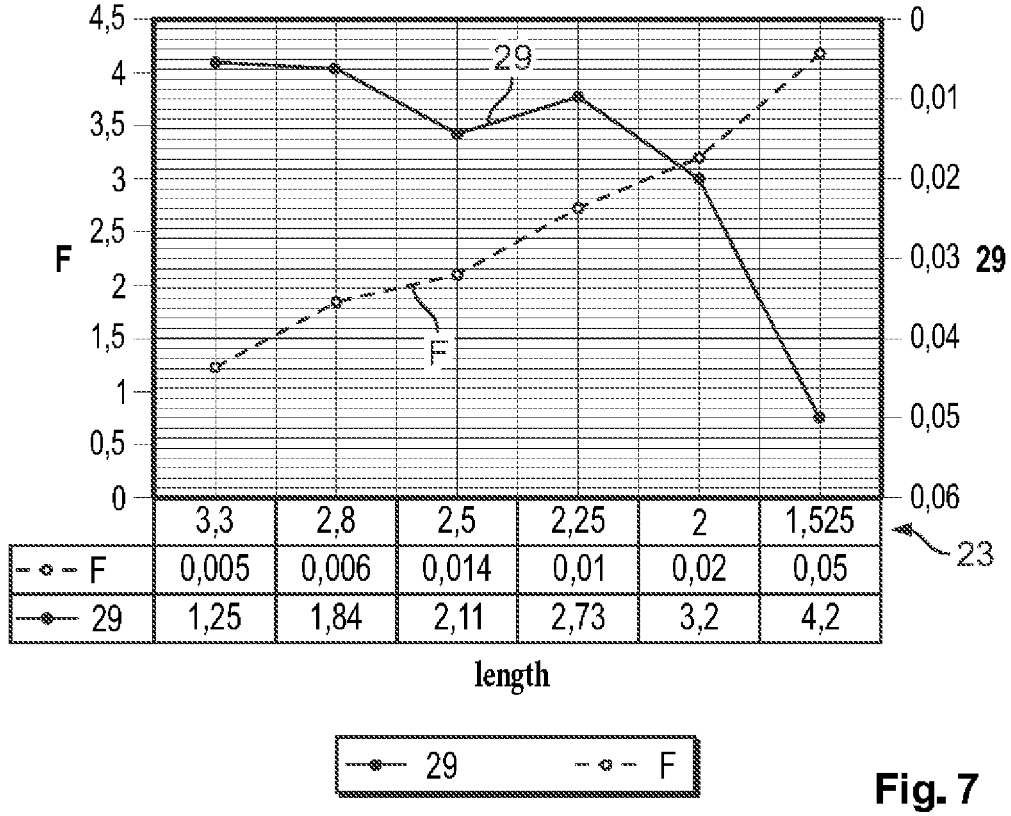
FIG. 7 is a graph of a permanent deformation and a spring force of the contact elements according to the embodiments of FIGS. 1-5.

The properties of these purely exemplary embodiments of the contact element 1 according to the invention are now to be compared with reference to FIGS. 6 and 7. In FIG. 6, a spring force F of the spring element 9 of each of the contact elements 1 is plotted against a deflection 27. In FIG. 7, the spring force F at a specific deflection 27 (the exact amount of this deflection 27 is irrelevant for this consideration), as well as a permanent deformation 29 for the five configurations of FIGS. 1 to 5 are plotted. By varying the cut length 23, the restoring force can be varied.

In the embodiment of FIG. 1, the cut length 23*a* is greater than the bending length 25 and, in an embodiment, less than twice the bending length 25 or equal to twice the bending length 25. In this case, a small spring force F is obtained, but also almost no permanent deformation 29. The lengths L1 and L2 satisfy the condition L2/L1≥0.5. This ratio of the lengths L1 and L2 to each other has the advantage of increasing the spring force of the contact spring for constant manufacturing size.

Figure 2:
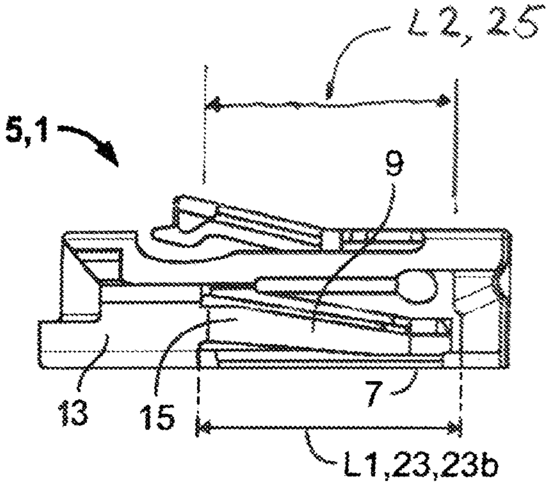
FIG. 2 is a side view of a contact element according to another embodiment.
Figure 3:
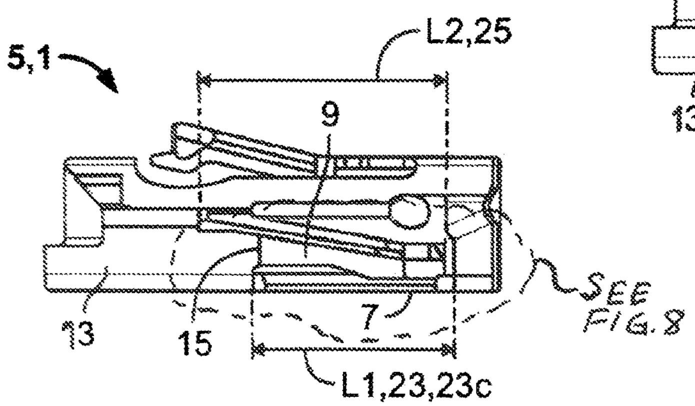
FIG. 3 is a side view of a contact element according to another embodiment.
Figure 4:
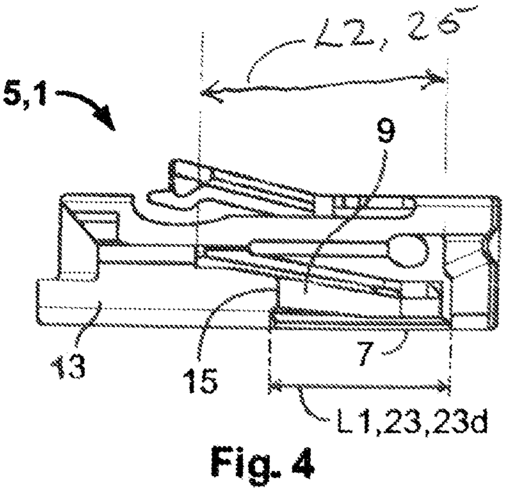
FIG. 4 is a side view of a contact element according to another embodiment.

In the embodiment of FIG. 2, the cut length 23*b* is exactly equal to the bending length 24, so that their ratio is 1. As can be seen from the dashed curve in FIG. 6, the spring element 9 of this embodiment already shows a hysteresis 31. This arises because the force acting on the spring element 9 and the resulting potential energy is partially used for the deformation of the spring element 9 and thus can no longer be returned via the restoring effect of the spring element 9.

The hysteresis 31 becomes more and more pronounced as the cut length 23 becomes shorter. For the embodiments of FIGS. 3 to 5, the cut lengths 23*c*, 23*d* and 23*e* are each shorter than the bending length 25. Provided that a ratio L2/L1 is defined, this can be greater than 1 for these embodiments. In this range, permanent deformation of the spring element 9 may be acceptable to negligible and the spring element 9 may have a sufficiently large restoring force.

If the corresponding spring element 9 is thus deflected in or opposite to the deflection direction 11, the base 7 can be elastically deformed and potential energy can be stored in the temporary deformation of the base 7. In particular, the base 7 may be curved in the same direction in which the spring element 9 is deflected, for example, away from the spring element 9 when the spring element 9 is deflected toward the base 7. This energy can be returned via the spring element 9 in the form of the movement of the spring element 9 back to the initial position along the spring travel, for example onto an inserted contact element.

The embodiment of FIG. 5 has a very short cut length 23*e* and a correspondingly large spring base 15. Accordingly, compared to the other embodiments, a high spring force F can be achieved with this embodiment. However, this is achieved at the expense of a high permanent deformation 29, as can be seen clearly from the hysteresis 31 in FIG. 6.

Figure 9:
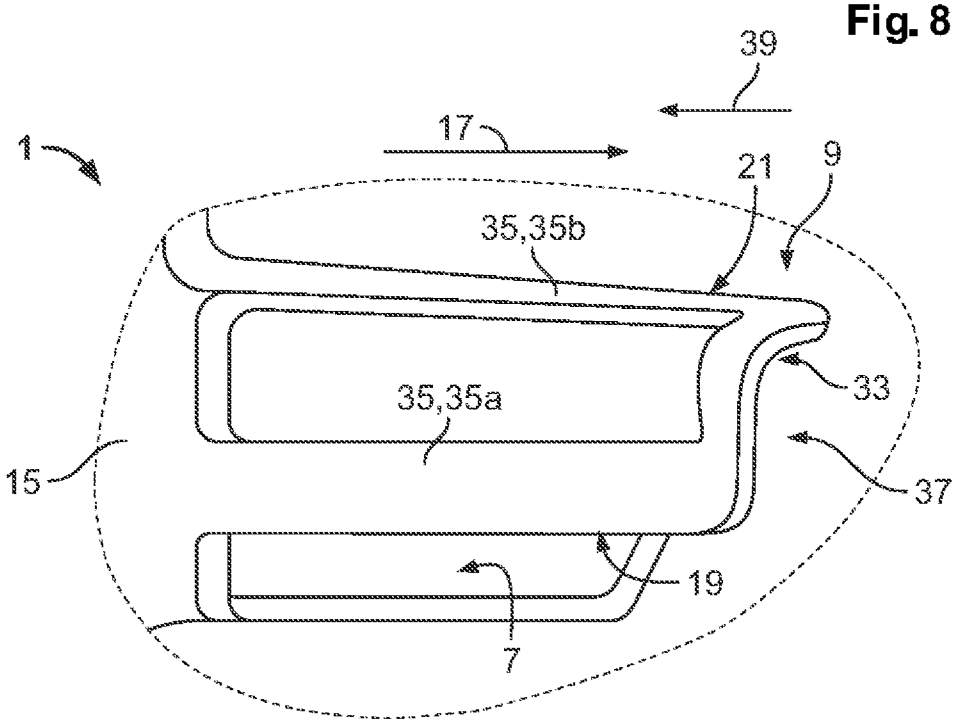
FIG. 9 is a schematic detailed view of a spring element according to another embodiment.

FIG. 9 shows a further embodiment of the contact element 1, in particular the spring element 9. The spring element 9 has an L-shaped cross-section 33 and two opposing spring legs 35. The spring legs 35 are connected to each other distal to the spring base 15. Further, both spring legs 35 extend parallel to each other substantially along the longitudinal direction 17. Such an embodiment can save material and weight, but without reducing the stability of the spring element 9. Furthermore, this embodiment allows easier bending, for example, if the L-shaped cross-section 33 is to be formed. Furthermore, the spring legs 35 can also be connected to each other at the spring base 15. In a further embodiment of the contact element 1, one spring leg 35 may extend along the other spring leg 35.

An L-shaped spring element 9, due to the bend, it allows a greater restoring force upon deflection than without a bend. The L-shaped cross-section 33 is seen in the longitudinal direction 17. Such a spring element 9 can thus have a section that can be oriented in a plane perpendicular to the base 7 and another section that can be oriented parallel to the base 7.

In the embodiment of the spring element 9 shown in FIG. 9, the first side flank 19 is located on a first spring leg 35*a* and the second side flank 21 is located on a second spring leg 35*b*. In such an embodiment, the second spring leg 35*b* can be longer than a first spring leg 35*a* and define the bending length 25. In this embodiment, the first side flank 19 faces away from the second spring leg 35*b* and the second side flank 21 faces away from the first spring leg 35*a*. The first side flank 19 can be located on the side of the first spring leg 35*a* facing away from the second spring leg 21, and the second side flank 21 can be located on the side of the second spring leg 35*b* facing away from the first spring leg 35*a*. In another embodiment, the first side flank 19 and the second side flank 21 are arranged on a same spring leg 35*a*, 35*b*.

The spring element 9 and the base 7 can define a receiving chamber 37 shown in FIG. 9 in which, for example, a complementary contact element can be received in an insertion direction 39. The receiving chamber 37 is limited on one side by the base 7. This base 7 not only enables a sufficiently high normal force in conjunction with the spring element 9, but also represents a geometrical element of the contact element 1. In an embodiment, the receiving chamber 37 is limited by the spring element 9 opposite the base 7. Such a receiving chamber 37 may already be sufficiently determined by the spring element 9 and the base 7. This may exemplarily be the case for rectangular or square complementary or mating contact elements. For complementary contact elements with a round cross-section, the receiving chamber 37 may provide a further wall. The insertion direction 39 is oriented opposite to the longitudinal direction 17 in an embodiment. In an embodiment, the spring base 15 may be arranged offset into the receiving chamber 37 in the insertion direction 39 and the spring element 9 may extend away from the spring base 15 opposite to the insertion direction 39.

What is claimed is:

1. A contact element for an electrical plug, comprising:

a base; and a spring element deflectable towards and/or away from the base, the spring element is laterally limited by a first side flank and a second side flank, the spring element has a spring base at an end of the spring element connected to the base, the spring element extends away from the spring base in a longitudinal direction, the first side flank is closer to the base than the second side flank and the second side flank faces away from the first side flank, the first side flank has a first length and the second side flank has a second length, a ratio of the second length to the first length is greater than or equal to 1.1; and wherein the spring element has a section oriented in a plane extending from and perpendicular to the base and another section oriented in a plane extending from and parallel to the base, thereby forming a substantially L-shaped cross-section.

2. The contact element of claim 1, wherein the spring element is deflectable perpendicularly towards and/or away from the base.

3. The contact element of claim 1, wherein the first length is less than the second length.

4. The contact element of claim 1, wherein the spring element is divided into a pair of opposing spring legs that are connected to each other distal to the spring base.

5. The contact element of claim 4, wherein one of the spring legs of the pair of opposing spring legs extends along the other spring leg of the pair of opposing spring legs.

6. The contact element of claim 4, wherein the first side flank and the second side flank are arranged on a same spring leg of the pair of opposing spring legs.

7. The contact element of claim 4, wherein the first side flank is formed on a first spring leg of the pair of opposing spring legs and the second side flank is formed on a second spring leg of the pair of opposing spring legs.

8. The contact element of claim 7, wherein the first side flank faces away from the second spring leg.

9. The contact element of claim 8, wherein the second side flank faces away from the first spring leg.

10. The contact element of claim 1, wherein the spring element and the base are made of a sheet metal.

11. The contact element of claim 10, wherein the contact element has a sheet thickness of less than 0.2 mm.

12. The contact element of claim 1, wherein the contact element has a receiving chamber for insertion of a complementary contact.

13. The contact element of claim 12, wherein the receiving chamber is limited on a side by the base.

14. The contact element of claim 13, wherein the receiving chamber is limited by the spring element opposite the base.

15. The contact element of claim 12, wherein the receiving chamber has an insertion direction for inserting the complementary contact into the receiving chamber.

16. The contact element of claim 15, wherein the spring base is arranged offset into the receiving chamber in the insertion direction.

17. The contact element of claim 16, wherein the spring element extends away from the spring base opposite to the insertion direction.

18. The contact element of claim 1, wherein the ratio of the second length to the first length is greater than or equal to 1.2.

19. The contact element of claim 1, comprising a first side flank located on a first spring leg and a second side flank located on a second spring leg, wherein the second spring leg is longer than the first spring leg and the first side flank faces away from the second spring leg and the second side flank faces away from the first spring leg.

* * * * *